United States Patent [19]

Ito et al.

[11] 4,411,724

[45] Oct. 25, 1983

[54] PROCESS OF AND APPARATUS FOR SPLICING CORD PLY SEGMENTS AT THEIR END FACES

[75] Inventors: Taizo Ito, Higashimurayama; Yusuke Araki, Tachikawa, both of Japan

[73] Assignee: Bridgestone Tire Company Limited, Tokyo, Japan

[21] Appl. No.: 421,318

[22] Filed: Sep. 22, 1982

[30] Foreign Application Priority Data

Sep. 29, 1981 [JP] Japan .................................. 56-154204

[51] Int. Cl.³ .................................................. B32B 25/10
[52] U.S. Cl. .................................... 156/304.1; 156/156; 156/157; 156/159; 156/502; 156/266; 156/507; 156/405.1; 156/134; 198/604; 198/570; 198/690; 271/202; 156/906; 156/907
[58] Field of Search ............... 156/156, 133, 157, 134, 156/159, 405.1, 507, 258, 266, 502, 406.4, 304.1, 156, 906, 907; 198/512, 544, 605, 604, 602, 577, 575, 198, 570, 461, 690; 271/193, 202, 203

Primary Examiner—Edward C. Kimlin
Assistant Examiner—Merrell C. Cashion, Jr.

[57] ABSTRACT

Herein disclosed is a splicing apparatus for splicing together the leading end face of one of cord ply segments and the trailing end face of another cord ply segment positioned in front of one of the cord ply segments. The apparatus comprises a first conveyor having a first surface, a second conveyor fixed with respect to the first conveyor and having a second surface spaced apart from and in face-to-face relationship to the first surface of the first conveyor and for conveying the cord ply segments on the second surface thereof in a second conveyance direction substantially in parallel with the first conveyance direction of the first conveyor, and transfer members for transferring each of the cord ply segments on the first surface of the first conveyor to the second surface of the second conveyor. The cord ply segments are transferred from the first conveyor to the second conveyor to splice together the leading end face of one of cord ply segments and the trailing end face of another cord ply segment positioned in front of one of the cord ply segments already transferred on the second conveyor.

3 Claims, 12 Drawing Figures

PROCESS OF AND APPARATUS FOR SPLICING CORD PLY SEGMENTS AT THEIR END FACES

FIELD OF THE INVENTION

The present invention relates in general to a process of and an apparatus for splicing together the end faces of two adjacent flat cord ply segments each having a relatively small width to produce rubber-covered cord plies for bias and radial tires. More specifically, the present invention relates to a process of and an apparatus for splicing together the leading end face of one of the cord ply segments and trailing end face of another cord ply segment positioned adjacent to and in front of one of the cord ply segments.

In general, each of the cord ply segments is reinforced by reinforcement cords such as steel cords and the like which are embedded in each of the cord ply segments spaced apart in parallel from each other. For production of a pneumatic bias or radial tire, it is required to splice together the end faces of two adjacent flat cord ply segments. There have so far been proposed a wide variety of splicing apparatus representative one of which comprises a retaining mechanism including a gripping unit for gripping each of the cord ply segments, and a conveyor mechanism including a conveyor disposed at a predetermined angle with respect to the movement direction of the gripping unit for conveying each of the cord ply segments received from the gripping unit of the retaining mechanism. The gripping unit of the retaining mechanism is adapted to be movable to and away from a position on the conveyor of the conveyor mechanism. In the prior-art splicing apparatus, the cord ply segments are subsequently transferred from the gripping unit to the conveyor of the conveyor mechanism where the leading end portion of each of the cord ply segments is overlappedly compressed and spliced to the trailing end portion of each of the cord ply segments already transferred to the conveyor of the conveyor mechanism. For splicing the cord ply segments to each other, the gripping unit of the retaining mechanism incorporated in the prior-art splicing apparatus has to be movable to and away from the position over the conveyor of the conveyor mechanism. In other words, such a splicing operation of the cord ply segments requires a reciprocating motion of the gripping unit of the retaining mechanism, which results not only in requiring much time for one cycle of the splicing of the splicing operation but also in inaccurately positioning of the cord ply segments to be spliced to each other on the conveyor of the conveyor mechanism due to mechanical errors of the gripping unit of the retaining mechanism.

DESCRIPTION OF THE OBJECT

It is therefore a primary object of the present invention to provide splicing process and apparatus which can reduce time for splicing the cord ply segments to each other and can enhance production speed.

It is another object of the present invention to provide splicing process and apparatus which can eliminate mechanical errors caused by the prior-art splicing apparatus.

It is a further object of the present invention to provide splicing process and apparatus which are suitable for small production of various sorts of tires.

SUMMARY OF THE INVENTION

In accordance with the present invention, there is provided a splicing process of splicing together the leading end face of one of cord ply segments and the trailing end face of another cord ply segment positioned in front of one of the cord ply segments, preparing a first conveyor having a first surface on which each of the cord ply segments are conveyed by the first conveyor in a first conveyance direction at a first conveyance speed, a second conveyor fixed with respect to the first conveyor and having a second surface spaced apart from and in face-to-face relationship to the first surface of the first conveyor and for conveying the cord ply segments on the second surface thereof in a second conveyance direction substantially in parallel with the first conveyance direction of the first conveyor, and transfer means for transferring each of the cord ply segments on the first surface of the first conveyor to the second surface of the second conveyor, placing a plurality of cord ply segments, severed to have a predetermined length, on a first conveyor at a predetermined interval and at a predetermined angle with respect to the first conveyance direction of the first conveyor, conveying the cord ply segments on the first conveyor at a predetermined speed, and transferring the cord ply segments from the first conveyor to the second conveyor to splice together the leading end face of one of cord ply segments and the trailing end face of another cord ply segment positioned in front of one of the cord ply segments already transferred on the second conveyor in such a manner that the leading end face of one of cord ply segments is brought into contact with the second surface of the second conveyor with the leading end portion of one of the cord ply segments sliding with respect to the second surface of the second conveyor while the second conveyor is operated to move at a speed slower than that of the first conveyor. The previously mentioned splicing process is put into practiced by a splicing apparatus for splicing together the leading end face of one of cord ply segments and the trailing end face of another cord ply segment positioned in front of one of the cord ply segments, comprising in combination, a feeding mechanism for severing an elongated rubber-covered cord ply into a plurality of cord ply segments each having a predetermined length and for supplying the cord ply segments in a feed direction and at a predetermined interval, and a joint mechanism comprising a first conveyor fixed with respect to the feeding mechanism and having a first surface onto which each of the cord ply segments are fed by the feeding mechanism and on which each of the cord ply segments are conveyed by the first conveyor in a first conveyance direction at a predetermined angle with respect to the feed direction of the feeding mechanism and at a first conveyance speed, the first conveyor having a first retaining member for retaining each of the cord ply segments on the first surface of the first conveyor, a second conveyor fixed with respect to the first conveyor and having a second surface spaced apart from and in face-to-face relationship to the first surface of the first conveyor and for conveying the cord ply segments on the second surface thereof in a second conveyance direction substantially in parallel with the first conveyance direction of the first conveyor and at a second conveyance speed slower than the first conveyance speed of the first conveyor, the second conveyor having a second retaining member for retaining each of the cord ply segments on the second surface of the second conveyor, and transfer means for transferring each of the cord ply segments on the first surface of the first conveyor to the second surface of the second conveyor while the second conveyor is being operated to move at a speed slower than that of the second conveyor in such a manner that the leading end face of one of cord ply segments is spliced together with the trailing end face of another cord ply segment positioned in front of one of the cord ply segments already transferred on the second conveyor. The first retaining member is constituted by a first electromagnet extending longitudinally of and within the first conveyor, and the second retaining member is constituted by a second electromagnet extending longitudinally of and within the second conveyor, the electromagnet in the second conveyor being larger in magnetic force than the electromagnet in the first conveyor to the extent that the cord ply segments are able to be transferred from the first conveyor to the second conveyor. The transfer means is constituted by portions of the first and second electromagnets which are overlapped to each other.

BRIEF DESCRIPTION OF THE DRAWINGS

Features and advantages of a splicing process of and an splicing apparatus for splicing the cord ply segments according to the present invention will be more clearly understood from the following drawings in which.

DESCRIPTION OF THE PREFERRED EMBODIMENTS

Referring now to the drawings and in particular to FIGS. 1 to 4, there is shown one of preferred embodiments embodying the present invention which comprises a feeding mechanism 1 for severing an elongated rubber-covered cord ply, reinforced by steel cords or the like, into a plurality of rubber-covered cord ply segments each having a predetermined length and for supplying the cord ply segments in a feed direction of the feeding mechanism 1 and at a predetermined interval, and a joint mechanism 2 for receiving the cord ply segments from the feeding mechanism 1 and for splicing together the leading end face of one of the cord ply segments and the trailing end face of another cord ply segment positioned in front of one of the cord ply segments.

The feeding mechanism 1 is shown in FIGS. 3 and 5 to 11 as comprising a pair of feed rollers 3 and 3' one of which is driven to rotate by a pulse motor 4, a guillotine cutter 5 positioned in front of the rollers 3 and 3' so as to sever an elongated rubber-covered cord ply into a plurality of cord ply segments each having a predetermined length, and a plurality of centering rollers 6 arranged at the rear of the rollers 3 and 3' for centering the elongated rubber-covered cord ply being fed by the rollers 3 and 3'. The guillotine cutter 5 includes upper and lower blades 5a and 5b extending at a predetermined angle with respect to the feed direction of the feeding mechanism 1 and relatively movable toward and away from each other. In the present embodiment herein shown, the lower blade 5b is assumed to be driven by means of an air cylinder 7 to be brought into engagement with the upper blade 5a. The feed mechanism 1 further comprises a feed conveyor 8 positioned in front of the cutter 5 and including a pair of rollers 9 and 9' respectively having center axes spaced apart in parallel from each other, one of the rollers 9 and 9' being driven by means of the pulse motor 4 to rotate at a circumferential speed substantially equal to that of the roller 3, a plurality of endless belts 10 passing on the rollers 9 and 9' in spaced and parallel relationship to each other, and an elongated electromagnet 11 extending longitudinally of the feed conveyor 8 and positioned between the rollers 9 and 9' within the feed conveyor 8 in the vicinity of the upper travelling paths of the endless belts 10 so as to attract steel cords embedded in each of the cord ply segments and thereby to retain each of the cord ply segments on the feed conveyor 8. The feed mechanism 1 further comprises a lifting member 12 having a base portion and a plurality of plate portions integral with the base portion and upwardly projecting from the base portion in spaced and parallel relationship to each other so as to pass through gaps formed between the endless belts 10 for lifting each of the cord ply segments, and an air cylinder 13 having a piston rod the leading end of which is securely connected to the bottom surface of the base portion of the lifting member 12.

The joint mechanism 2 is shown in FIGS. 4 and 5 to 11 as comprising a first conveyor 21 in part overlappedly positioned above the feed conveyor 8 at a predetermined angle with respect to the feed conveyor 8 in such a way that the cord ply segments are consecutively spliced together without altering positions of the segments, a pair of rollers 22 and 22' respectively having center axes spaced apart in parallel from each other, one of the rollers 22 and 22' being driven to rotate at a predetermined circumferential speed, a plurality of endless belts 23 passing on the rollers 22 and 22' in spaced and parallel relationship to each other, and a first retaining member or elongated electromagnet 24 extending longitudinally of the first conveyor 21 and positioned between the rollers 22 and 22' within the first conveyor 21 in the vicinity of the lower travelling paths of the endless belts 23 so as to attract each of the steel cords in the cord ply segments and thereby to retain each of the cord ply segments on a first or lower surface of the first conveyor 21. The first conveyor 21 is thus fixed with respect to the feeding mechanism 1 and has a first surface onto which each of the cord ply segments are fed by the feeding mechanism 1 and on which each of the cord ply segments are conveyed by the first conveyor 21 in a first conveyance direction at a predetermined angle with respect to the feed direction of the feeding mechanism 1 and at a first conveyance speed. The electromagnet 24 in the first conveyor 21 is larger in magnetic force than the electromagnet 11 in the feed conveyor 8 to the extent that the cord ply segments are able to be transferred from the feed conveyor 8 to the first conveyor 21. The joint mechanism 2 further comprises a second conveyor 31 in part overlappedly positioned below the first conveyor 21 so as to receive the cord ply segments conveyed by the first conveyor 21, a pair of rollers 32 and 32' respectively having center axes spaced apart in parallel from each other, one of the rollers 32 and 32' being driven to rotate at a predetermined circumferential speed, a plurality of endless belts 33 passing on the rollers 32 and 32' in spaced and parallel relationship to each other, and a second retaining member or elongated electromagnet 34 extending longitudinally and positioned between the rollers 32 and 32' within the second conveyor 31 in the vicinity of the upper travelling paths of the endless belts 33 so as to attract the steel cords in the cord ply segments and thereby to retain the cord ply segments on a second or upper surface of the second conveyor 31. The second conveyor 31 is thus fixed with respect to the first conveyor 21 and has the second surface spaced apart from and in face-to-face relationship to the first surface of the first conveyor 21 for conveying the cord ply segments on the second surface thereof in a second conveyance direction substantially in parallel with the first conveyance direction of the first conveyor and at a second conveyance speed slower than the first conveyance speed of the first conveyor 21. The electromagnet 34 in the second conveyor 31 is larger in magnetic force than the electromagnet 24 in the first conveyor 21 to the extent that the cord ply segments are able to be transferred from the first conveyor 21 to the second conveyor 31. The portions of the first and second electromagnets 24 and 34 which are overlapped to each other constitute transfer means for transferring each of the cord ply segments on the first surface of the first conveyor 21 to the second surface of the second conveyor 31 while the second conveyor 31 is being operated to move at a speed slower than that of the second conveyor 31 in such a manner that the leading end face of one of cord ply segments is spliced together with the trailing end face of another cord ply segment positioned in front of one of the cord ply segments already transferred on the second conveyor 31.

The first and second conveyors 21 and 31 are driven by a variable speed electric motor 37 through timing belts 35 and 36, respectively, in such a manner that an accurately speed-controlled transmission gear 38 causes the second conveyor 31 to be driven at a speed slower than that of the first conveyor 21.

Operation of the splicing apparatus thus constructed and arranged as above will be described hereinafter.

Figure 1:
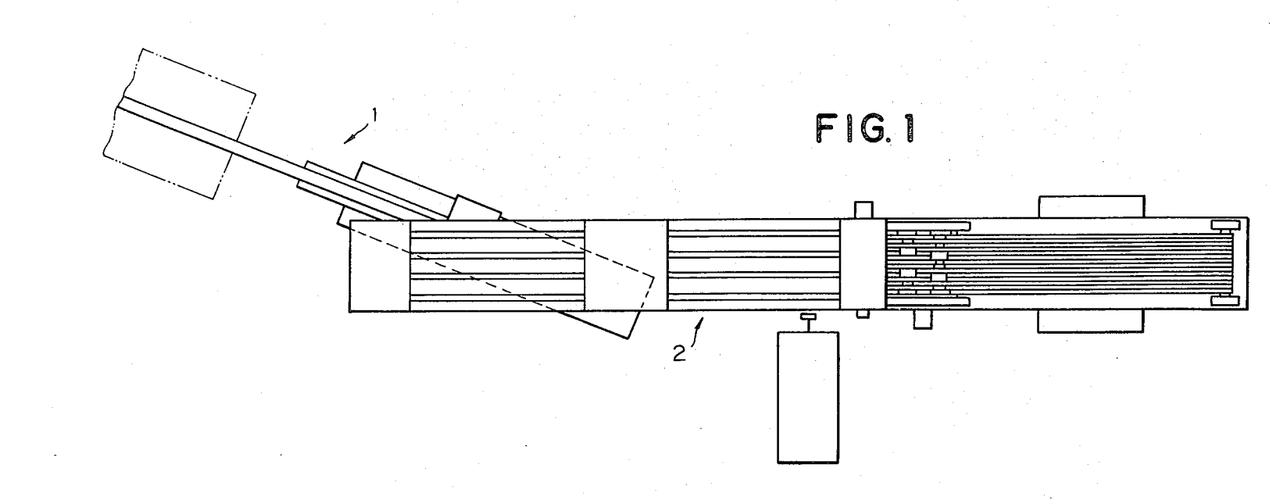
FIG. 1 is a schematic plan view of a splicing apparatus according to the present invention and showing a feed mechanism and a joint mechanism incorporated in the apparatus.
Figure 2:
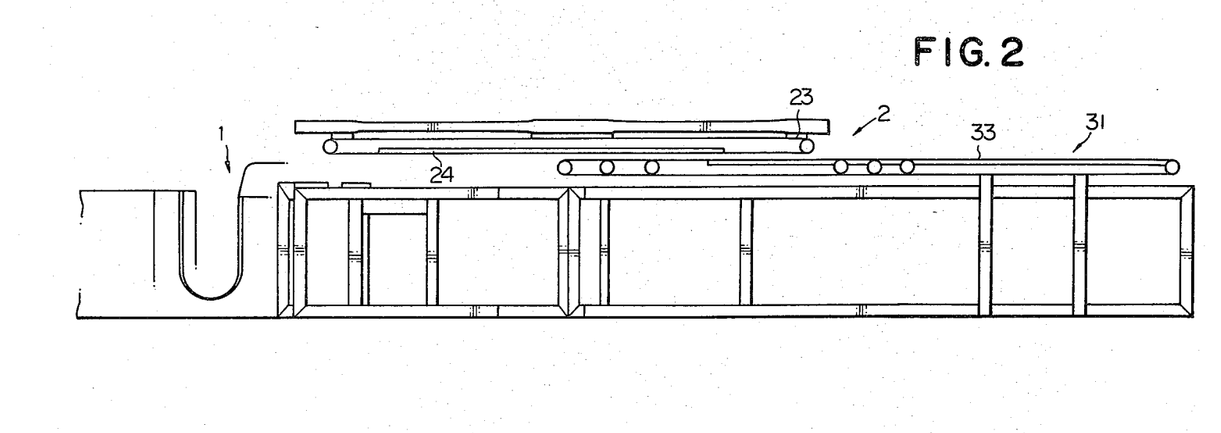
FIG. 2 is a schematic side view of the feed mechanism and the joint mechanism incorporated in the apparatus.
Figure 3:
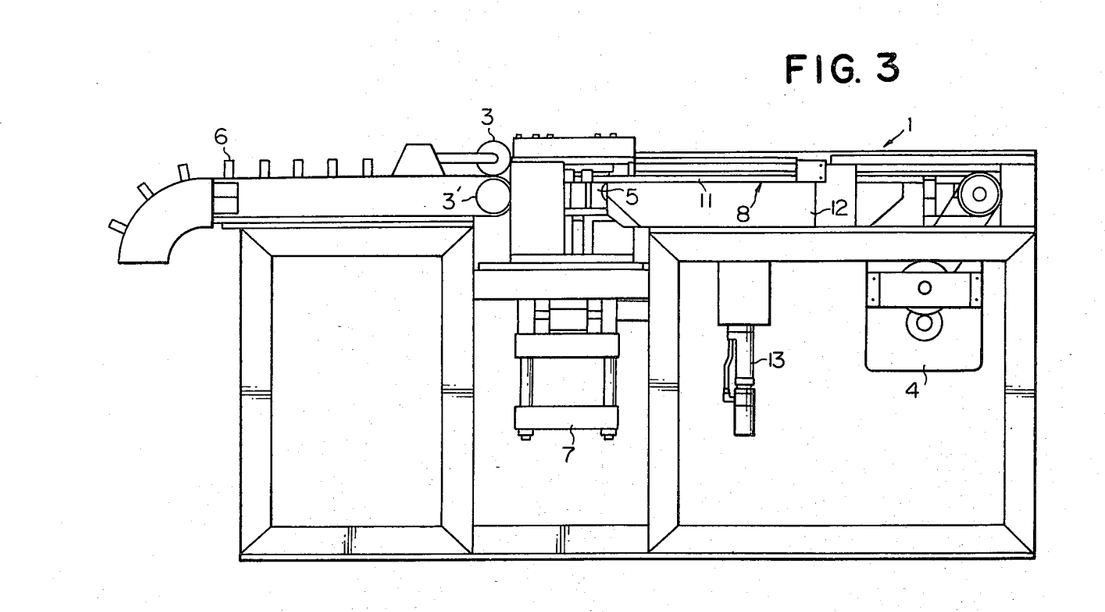
FIG. 3 is an enlarged schematic side view of the feed mechanism of the apparatus.
Figure 4:
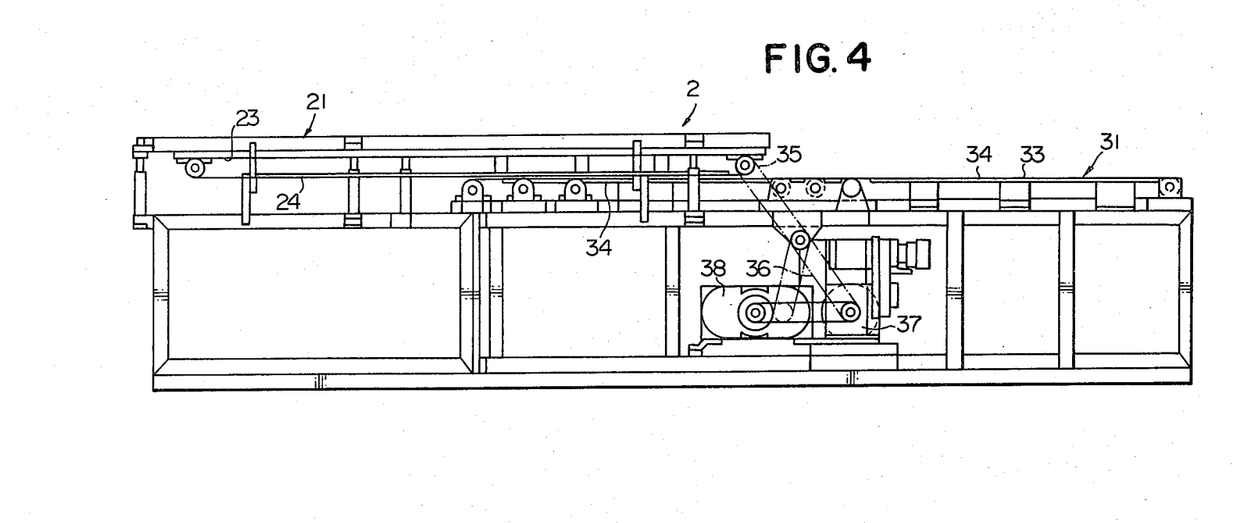
FIG. 4 is an enlarged schematic side view of the joint mechanism of the apparatus.
Figure 5:
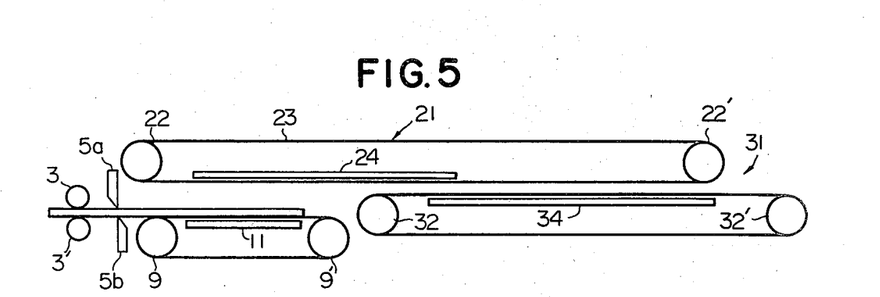
FIGS. 5 to 12 are schematic side view of the feed and joint mechanisms and showing the steps of splicing the cord ply segments.
Figure 6:
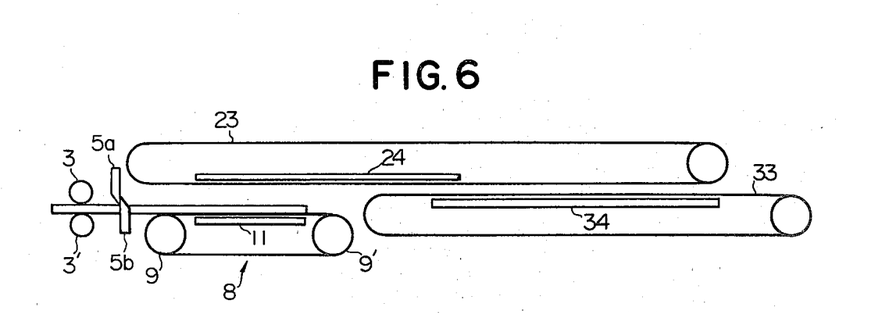
Figure 7:
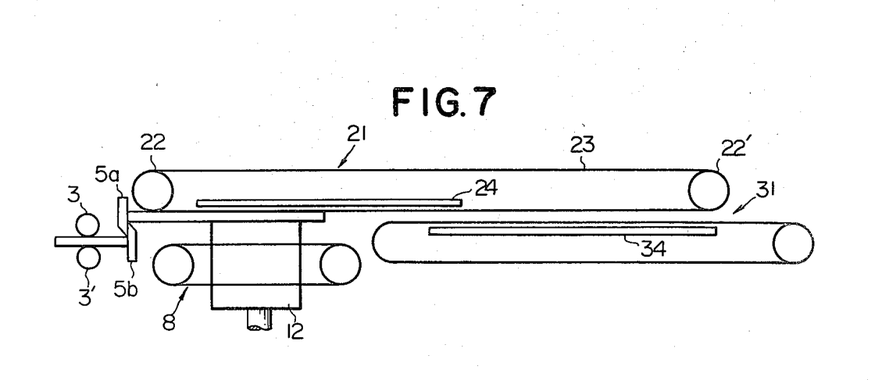
Figure 8:
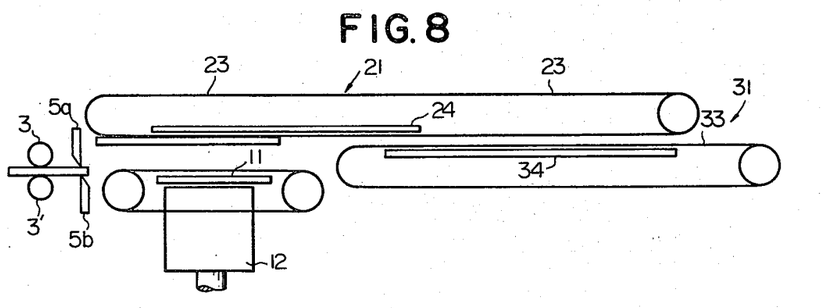
Figure 9:
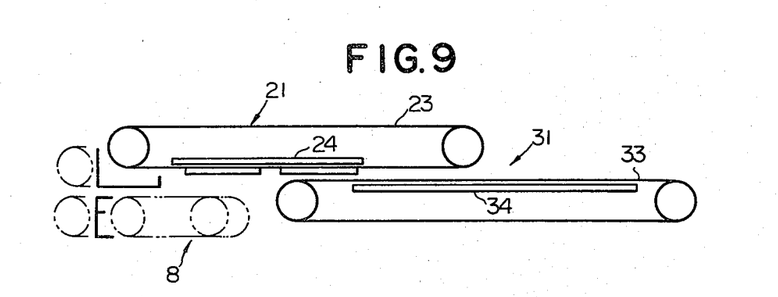

A predetermined length of the elongated rubber-covered cord ply is initially intermittently fed toward the cutter 5 by means of the pulse motor 4. In this instance, a predetermined number of pulses is supplied to the pulse motor 4 to cause the predetermined length of elongated rubber-covered cord ply to pass through the cutter 5 as shown in FIG. 5. The elongated rubber-covered cord ply thus fed to the cutter 5 is by no means moved of the feed conveyor 8 since the elongated rubber-covered cord ply is retained by the electromagnet 11. The number of pulses fed to the pulse motor 4 is completely correspondent to the predetermined length of the cord ply segment, which makes it easy to set the predetermined length of the cord ply segment. Thereafter, the lower blade 5b of the cutter 5 is operated upwardly by the air cylinder 7 and severs the elongated rubber-covered cord ply into the predetermined length of the cord ply segment in cooperation with the upper blade 5a of the cutter as shown in FIG. 6. At this time, the cutter 5 is held at a predetermined angle with respect to the feed conveyor 8 in such a way that the cord ply segments are consecutively spliced together without altering positions of the segments. The cord ply segment thus severed by the upper and lower blades 5a and 5b of the cutter 5 is lifted above the upper path of the feed conveyor 8 by means of the lifting member 12 when the air cylinder 13 is actuated to cause its piston rod to project upwardly until the cord ply segment is lifted up to the lower path of the first conveyor 21 as shown in FIG. 7. The cord ply segment is thus brought into contact with the lower surface of the first conveyor 2 and attracted by the electromagnet 24 so that the cord ply segment is retained by the first conveyor 21. In this way, the cord ply segment is transferred from the feed conveyor 8 to the first conveyor 21. After the cord ply segment is transferred from the feed conveyor 8 to the first conveyor 21, the air cylinder 13 is again actuated to cause the piston rod downwardly so that the lifting member 12 is moved downwardly to assume its initial position as shown in FIG. 8. Such cycles of operations of the cord ply segment being transferred from the feed conveyor 8 to the first conveyor 21 will be repeated after the elongated rubber-covered cord ply is fed to the cutter 5 as shown in FIG. 5. By the reason that the first conveyor 21 is synchronized in movement to the feed conveyor 8, the predetermined numbers of cord ply segment each having a predetermined length are retained on the lower face of the first conveyor 21 spaced apart at a predetermined interval from and in parallel with one another. As the feed conveyor 8 and the first conveyor 21 are arranged at a predetermined angle with respect to each other, the cord ply segments are lined up on the lower surface of the first conveyor 21 at a predetermined angle with respect to the feed direction of the cord ply segment.

Figure 10:
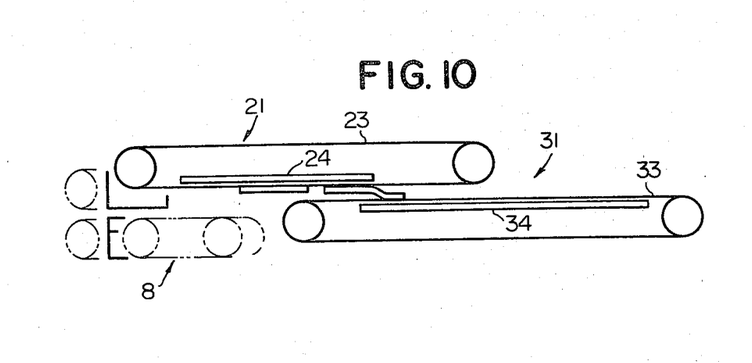
Figure 11:
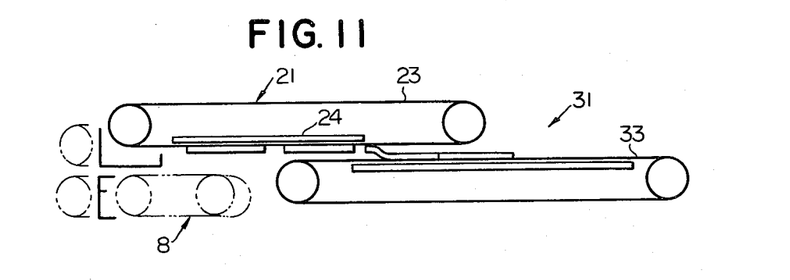

The predetermined numbers of cord ply segments thus retained on the lower surface of the first conveyor 21 is then to be transferred to the upper surface of the second conveyor 31. When the cord ply segment reaches a position where the electromagnet 24 in the first conveyor 21 overlaps the electromagnet 34 in the second conveyor 31, viz., the leading end of the cord ply segment passes over the forward end of the electromagnet 24 in the first conveyor 21 and arrives at the rear end of the electromagnet 34 in the second conveyor 34, the leading end of the cord ply segment is caused to transfer onto the upper surface of the second conveyor 31 from the lower surface of the first conveyor 21 resulting from the difference between magnetic forces of the electromagnets 24 and 34 in the first and second conveyors 21 and 31 and resulting from gravity of the cord ply segment. The cord ply segment is then gradually transferred to the upper surface of the second conveyor 31 from the lower surface of the first conveyor 21, and is finally retained on the upper surface of the second conveyor 31 by means of the electromagnet 34. Another or subsequent cord ply segment which follows the cord ply segment in spaced relationship thereto is transferred to the second conveyor 31 in a similar manner. At the initial stage of the transferring operation of the subsequent cord ply segment, the subsequent cord ply segment is forced to move at a same speed as the operation speed of the first conveyor 21 while being retained by the electromagnet 24 in the first conveyor 21 as shown in FIG. 10 by the reason that the contacting area of the subsequent cord ply segment on the first conveyor 21 is larger than that of the cord ply segment on the second conveyor 31 and that the second conveyor 31 is operated at a slower speed than that of the first conveyor 31. As a consequence, the leading end portion of the subsequent cord ply segment is forced to slide on the upper surface face of the second conveyor 31 as shown in FIG. 11 until the leading end portion of the subsequent cord ply segment is brought into pressing contact with the trailing end face of the cord ply segment already transferred to the second conveyor 31. At this time, the leading end face of the subsequent transferred is adhered to and butt-jointed to the trailing end face of the cord ply segment to the second conveyor 31. In the embodiment of the present invention, it is preferable that the compression amount or displacement of the subsequent cord ply segment be 3 to 5 percent of the length of the cord ply segment measured in the feed direction of the cord ply segment.

Figure 12:
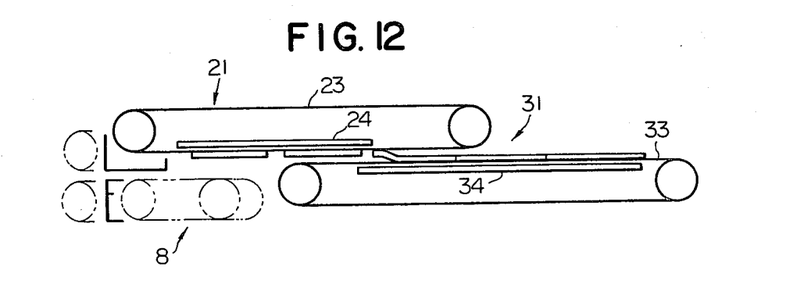

After the completion of the splicing operation of the leading end face of the subsequent cord ply segment and the trailing end face of the cord ply segment already transferred to the second conveyor 31, the subsequent cord ply segment is gradually increased in contact area with respect to the upper surface of the second conveyor 31 by means of the electromagnet 34 in the second conveyor 31 while moving at a same speed to the operation speed of the second conveyor 31 with the trailing end portion sliding on the lower surface of the first conveyor 21 as shown in FIG. 11. The subsequent cord ply segment is finally retained on the upper surface of the second conveyor 31 and has its leading end face firmly jointed to the trailing end face of the cord ply segment already transferred to the second conveyor 31 as shown in FIG. 12. As will be seen from the foregoing description, such a jointing cycle of jointing the leading end face of the subsequent to the trailing end face of the cord ply segment will be repeated to produce rubber-covered cord plies for bias and radial tires. In the jointing cycles previously mentioned, it is possible to make faster the operation speed of the conveyors 8, 21 and 31 if the difference between the operation speeds of the first and second conveyors 21 and 31 is selected not so as to have the cord ply segments overlapped.

While it has been described in the previously mentioned embodiment that the feed conveyor 8, the first conveyor 21 and second conveyor 31 are horizontally positioned as seen from FIGS. 1 to 12 of the drawings, these conveyors 8, 21 and 31 may be vertically or inclinedly positioned.

Where it has been described in the above that the electromagnets are employed for attracting the cord ply segments, permanent magnets may be employed in place of the electromagnets according to the present invention.

What is claimed is:

1. A splicing process of splicing together the leading end face of one of cord ply segments and the trailing end face of another cord ply segment positioned in front of one of the cord ply segments, comprising the steps of:
preparing a first conveyor having a first surface on which each of the cord ply segments are conveyed by the first conveyor in a first conveyance direction at a first conveyance speed, a second conveyor fixed with respect to said first conveyor and having a second surface spaced apart from and in face-to-face relationship to the first surface of said first conveyor and for conveying the cord ply segments on the second surface thereof in a second conveyance direction substantially in parallel with the first conveyance direction of said first conveyor, magnetic retaining means for retaining the cord ply segments on the first and second surfaces of the first and second conveyors, respectively and transfer means for transferring each of the cord ply segments on the first surface of said first conveyor to the second surface of said second conveyor,
placing a plurality of cord ply segments, severed to have a predetermined length, on a first conveyor at a predetermined interval and at a predetermined angle with respect to the first conveyance direction of the first conveyor,
conveying the cord ply segments on the first conveyor at a predetermined speed, and
transferring the cord ply segments from the first conveyor to the second conveyor to splice together the leading end face of one of cord ply segments and the trailing end face of another cord ply segment positioned in front of one of the cord ply segments already transferred on said second conveyor in such a manner that the leading end face of one of cord ply segments is brought into contact with the second surface of the second conveyor with the leading end portion of one of the cord ply segments sliding with respect to the second surface of said second conveyor while said second conveyor is operated to move at a speed slower than that of the first conveyor.

2. A splicing apparatus for splicing together the leading end face of one of cord ply segments and the trailing end face of anotehr cord ply segment positioned in front of one of the cord ply segments, comprising in combination,
a feeding mechanism for severing an elongated rubber-covered cord ply into a plurality of cord ply segments each having a predetermined length and for supplying the cord ply segments in a feed direction and at a predetermined interval, and
a joint mechanism comprising a first conveyor fixed with respect to the feeding mechanism and having a first surface onto which each of the cord ply segments are fed by the feeding mechanism and on which each of the cord ply segments are conveyed by the first conveyor in a first conveyance direction at a predetermined angle with respect to the feed direction of the feeding mechanism and at a first conveyance speed, the first conveyor having a first retaining member for retaining each of the cord ply segments on the first surface of the first conveyor, a second conveyor fixed with respect to said first conveyor and having a second surface spaced apart from and in face-to-face relationship to the first surface of said first conveyor and for conveying the cord ply segments on the second surface thereof in a second conveyance direction substantially in parallel with the first conveyance direction of said first conveyor and at a second conveyance speed slower than the first conveyance speed of the first conveyor, the second conveyor having a second retaining member for retaining each of the cord ply segments on the second surface of the second conveyor, and transfer means for transferring each of the cord ply segments on the first surface of said first conveyor to the second surface of said second conveyor while the second conveyor is being operated to move at a speed slower than that of said second conveyor in such a manner that the leading end face of one of cord ply segments is spliced together with the trailing end face of another cord ply segment positioned in front of one of the cord ply segments already transferred on said second conveyor, wherein said first retaining member being constituted by a first magnet extending longitudinally of and within said first conveyor, said second retaining member being constituted by a second magnet extending longitudinally of and within said second conveyor, said magnet in the second conveyor being larger in magnetic force than said magnet in the first conveyor to the extent that the cord ply segments are able to be transferred from the first conveyor to the second conveyor.

3. A splicing apparatus as set forth in claim 2, in which said transfer means is constituted by portions of said first and second magnets which are overlapped to each other.

* * * * *